United States Patent

[11] 3,585,976

| [72] | Inventor | Paul M. Rider |
| | | P.O. Box 1369, Wewoka, Okla. 74884 |
| [21] | Appl. No. | 865,895 |
| [22] | Filed | Oct. 13, 1969 |
| [45] | Patented | June 22, 1971 |

[54] MANIFOLD VACUUM CONTROLLED SUPPLEMENTAL AIR INLET WITH AIR FILTERING MEANS
8 Claims, 3 Drawing Figs.

[52] U.S. Cl. ................................................ 123/124,
123/97 B, 123/119 B, 123/119 D, 137/480, 261/DIG. 19
[51] Int. Cl. .................................................... F02m 23/04,
F02d 9/00, F02m 25/06
[50] Field of Search ........................................... 123/119 B,
119 D, 97 B, 124, 124 A, 124 B; 137/480; 261/DIG. 19

[56] References Cited
UNITED STATES PATENTS

| 1,211,636 | 1/1917 | Spray .......................... | 123/124 |
| 2,114,655 | 4/1938 | Leibing ....................... | 123/97 (B) |
| 2,311,351 | 2/1943 | Schmeltz ..................... | 123/119 (D) |
| 2,602,435 | 7/1952 | Boyan ......................... | 123/119 (D) |
| 2,876,757 | 3/1959 | Koriener ..................... | 123/124 |
| 2,944,646 | 7/1960 | Willmer ....................... | 123/97 (B) |
| 2,969,800 | 1/1961 | Skirvin et al. ................ | 137/480 UX |
| 3,034,492 | 5/1962 | Harmon ....................... | 123/124 |
| 3,274,984 | 9/1966 | Dolfi, Sr. ..................... | 123/124 |
| 3,509,967 | 5/1970 | Ballard ........................ | 123/119 (B)X |

*Primary Examiner*—Wendell E Burns
*Attorneys*—Clarence A. O'Brien and Harvey B. Jacobson ABSTRACT: A supplemental air inlet system for the air and fuel intake passage of a naturally aspirated internal combustion engine. The system includes a filtered air inlet line with the inlet end thereof open to the ambient atmosphere, or communicated with the interior of the crankcase of an associated internal combustion engine, and the outlet end thereof communicated with the air and fuel intake passage of the engine. Manifold vacuum controlled valve structure is provided and operatively associated with the inlet end of the line and is operative to increase the flow of air or crankcase vapors into the line in response to an increase of engine vacuum and the valve structure is adjustable whereby the initial opening of the valve structure may occur at any given manifold vacuum.

PATENTED JUN22 1971 3,585,976

Paul M. Rider
INVENTOR.

BY Clarence A. O'Brien
and Harvey B. Jacobson
Attorneys

MANIFOLD VACUUM CONTROLLED SUPPLEMENTAL AIR INLET WITH AIR FILTERING MEANS

The supplemental air inlet system of the instant invention has been specifically designed to provide a means whereby supplemental air may be admitted into the intake manifold of an internal combustion engine in response to an increase of manifold vacuum.

In a naturally aspirated internal combustion engine the manifold vacuum increases from minimum vacuum which occurs at low speed while operating under full throttle conditions as the speed of the engine increases with a reduction of load on the engine, as the throttle valve of the associated carburetor is moved from the full open position to the fully closed idle position and when the vehicle is coasting at a speed greater than that which would occur at idle engine speeds with the throttle valve of the carburetor in a fully closed position.

The supplemental air intake of the instant invention is constructed in a manner whereby very little or no supplemental air is admitted into the intake passages of the associated engine during the periods the engine is functioning under low manifold vacuum conditions. Thus, when there is a demand on the associated engine for maximum power and a slightly greater fuel-to-air ratio is thus desired. However, as the load on the engine decreases and the throttle valve is closed and a greater fuel-to-air ratio is not desired, the air inlet system of the instant invention functions to admit supplemental air into the intake passages of the associated engine. In addition, when the engine is being driven by the associated vehicle such as when the vehicle is coasting and manifold vacuum is at its highest, the supplemental air inlet system of the instant invention automatically admits greater quantities of supplemental air into the intake passages of the engine. Thus, the supplemental air inlet system is operative to gradually reduce the fuel-to-air ratio as the demand for power from the engine decreases and to further reduce the fuel-to-air ratio when the engine is being driven by the associated vehicle such as when the vehicle is coasting.

By this operation the supplemental air inlet system is operative to effectively lean the air and fuel mixture when lighter loads are placed on the engine and to appreciably lean the air and fuel mixture when the engine is being driven by the associated vehicle and there is no need for any fuel to be discharged into the intake passages of the engine.

As a result of admitting larger quantities of supplemental air into the intake manifold passages when the vehicle is driving the associated engine, the maximum possible manifold vacuum is reduced thus resulting in there being less tendency for lubricating oil to be drawn upwardly past the pistons and around the intake valves. Accordingly, the supplemental air inlet system of the instant invention not only results in a savings of fuel but also a savings in oil and a reduction in the tendency of spark plugs to be fouled by oil. Further, by decreasing the fuel-to-air ratio is varied amounts at all times other than when the engine is operating under full throttle and heavy loads, the supplemental air inlet system functions to reduce air pollution from the exhaust of the associated engine inasmuch as the burning of overrich air-and-fuel mixtures in the associated internal combustion engine is reduced and less oil vapors are discharged through the exhaust system of the engine when the latter is being driven by the associated vehicle as the vehicle coasts.

The main object of this invention is to provide a supplemental air inlet system for the air and fuel intake passage of a naturally aspirated internal combustion engine which will function to relieve an excessively high fuel-to-air ratio mixture being admitted into the combustion chambers of the engine, except when maximum power is required.

A further object of this invention is to provide a system in accordance with the preceding object which will also function to relieve the inherent tendency of the exhaust from the associated engine to be contaminated with air pollutants.

A still further object of this invention is to provide a system which will function to increase gasoline mileage of a naturally aspirated vehicle internal combustion engine.

Another important object of this invention is to provide a system which will also serve to reduce the tendency of the associated engine to pump oil past the pistons and intake valve stems thereof.

A final object of this invention to be specifically enumerated herein is to provide a supplemental air inlet system for the air and fuel intake passage of a naturally aspirated internal combustion engine which will conform to conventional forms of manufacture, be of simple construction and automatic in operation so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
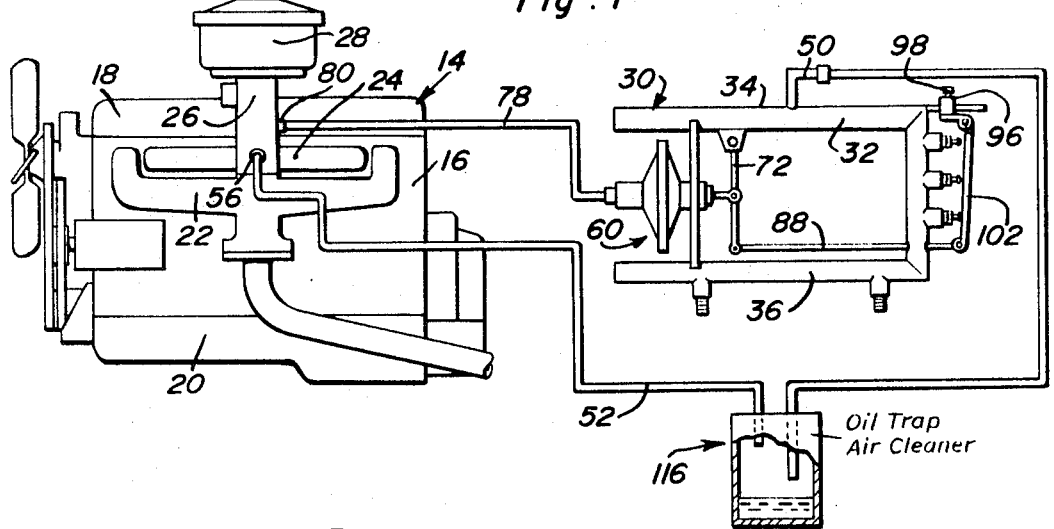
FIG. 1 is a schematic view of the supplemental air inlet system of the instant invention operatively associated with a conventional form of vehicle internal combustion engine.

Referring now more specifically to the drawings, the numeral 10 generally designates a conventional form of motor vehicle including an engine compartment 12 in which an engine referred to in general by the reference numeral 14 is mounted. The engine 14 includes a block 16, a head 18, a crankcase 20, an exhaust manifold 22 and an intake manifold 24 upon which carburetor 26 is mounted. The carburetor 26 includes an air horn portion (not shown) upon which a conventional air filter 28 is mounted.

The supplemental air inlet system of the instant invention is referred to in general by the reference numeral 30 and includes a U-shaped manifold pipe 32 including a pair of tubular parallel legs 34 and 36 interconnected at one pair of corresponding ends by means of a tubular connecting pipe or bight portion 38.

The manifold pipe 32 defines a mounting frame and the ends of the legs 34 and 36 remote from the connecting pipe 38 are plugged as at 40 and 42. Further, the leg 36 has a pair of shouldered threaded studs 44 secured thereto in any convenient manner at points spaced longitudinally therealong and the threaded studs 44 are secured through suitable openings or apertures provided therefor in the fire wall 46 of the vehicle 10 by means of threaded nuts 48.

The leg 34 has an elbow fitting 50 supported therefrom which opens into the leg 34 at one end and has the inlet end of a suitable pipe or conduit 52 removably secured to its other end as at 54. The outlet end of the pipe or conduit 52 opens into the central portion of the intake manifold 24 as at 56. Further, a transverse brace 58 is secured between the free end portions of the legs 34 and 36 and a vacuum motor referred to in general by the reference numeral 60 is supported from the brace 58 by means of a suitable fastener 62. The vacuum motor 60 may be in the form of a slightly modified conventional vacuum actuated distributor advance mechanism and includes a housing 64 having a spring-urged diaphragm 66 therein to which one end of an operating rod 68 is secured. The other end of the operating rod 68 is guidingly received through the neck portion 70 of the vacuum motor 60 which is secured through the brace 58 and is connected to the central portion of a lever 72 by means of a pin and slot connection 74. Further, the housing 64 includes an inlet neck 76 opening into the housing 64 on the side of the diaphragm 66 remote from the rod 68. A vacuum line 78 communicates the inlet neck 76 with a source of manifold vacuum as at 80 and a compression spring 82 is disposed within the housing 64 and acts upon the diaphragm 66 to urge the central portion of the diaphragm 66 in the direction in which the rod 68 extends. However, sufficient vacuum within the side of the housing 64 in which the spring 82 is disposed will act upon the diaphragm 66 to shift the latter toward the left as viewed in FIG. 3 of the drawings so as to compress the spring 82.

A mounting boss 84 is supported from the leg 34 and one end of the lever 72 is pivotally supported from the mounting boss 84 by means of a pivot fastener 86. In addition, one end of a connecting rod 88 is pivotally secured to the end of the lever 72 remote from the mounting boss 84 as at 90 and the other end portion of the rod 88 is slidably received through a guide tube section 92 sealingly secured through the connecting pipe of bight portion 38.

A support rod 94 has one end thereof secured to the end of the connecting pipe or bight portion 38 remote from the guide tube section 92 as at 94 and an apertured slide block 96 is slidably disposed on the rod 94 and provided with a setscrew 98 for releasably securing the slide block 96 in adjusted position on the rod 94. One end of a support flange 100 is anchored to the support block 96 and the other end of the flange 100 has a first end of an actuating lever 102 pivotally secured thereto as at 104. The other end of the actuating lever 102 is pivotally secured to the end of the rod 88 remote from the lever 72 as at 106 and the connecting pipe or bight portion 38 includes three inlet necks 108 spaced longitudinally therealong which open into the connecting pipe or bight portion 38 and which have Schrader valve cores 110. The valve cores 110 are provided with spring-urged valve plungers 112 which may be urged inwardly to open the valve cores 110 and whose outer ends include head portion 114 engageable by the lever 102.

Figure 3:
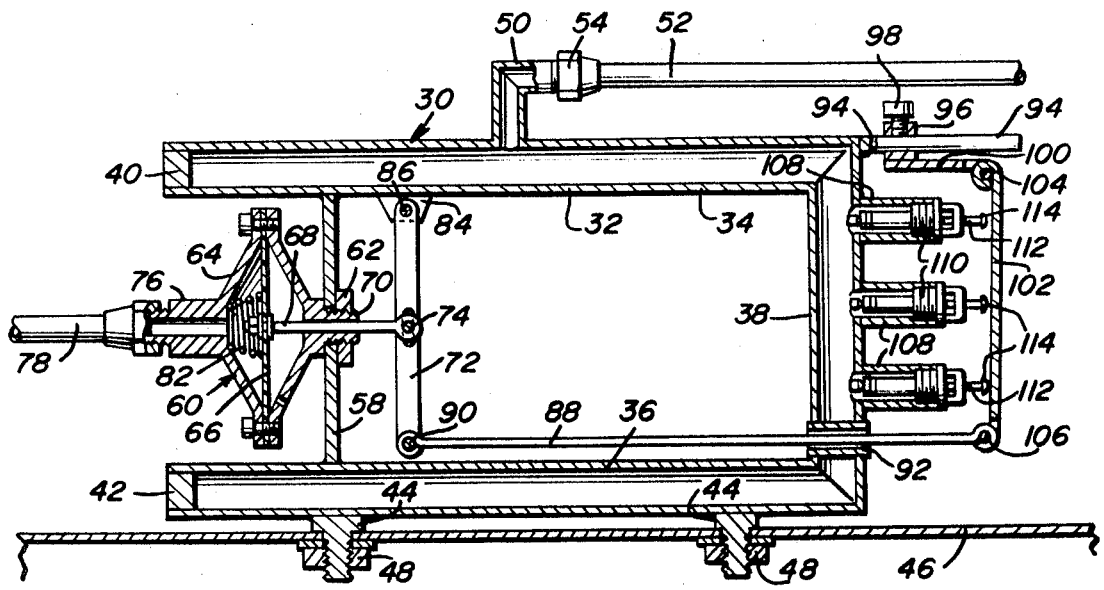
FIG. 3 is an enlarged fragmentary horizontal sectional view taken substantially upon the plane indicated by the section line 3-3 of FIG. 2.
Figure 2:
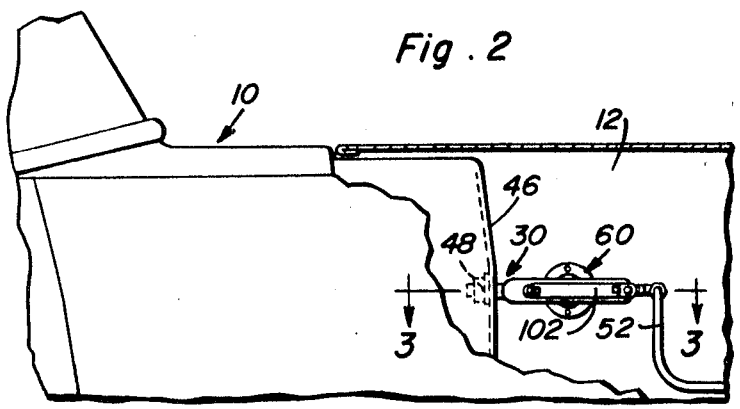
FIG. 2 is a fragmentary side elevational view of a motor vehicle with portions of the motor vehicle being broken away and illustrating a preferred manner of mounting the system of the instant invention within the engine compartment of the motor vehicle.

From FIG. 3 of the drawings it may be seen that the lowermost head 114 is first engaged by the lever 102 as the lower free swinging end of the lever 102 is swung toward the left and that the next higher head 114 will be engaged by the lever and displaced toward the left so as to open the associated valve core as the lower end of the lever 102 continues to swing toward the left. Of course, the operation of the entire valve assembly represented by the lever 102 and the components 108, 110, 112 and 114 may be adjusted by shifting the position of the slide block 96 along the support rod 94.

The pipe or conduit 52 has a conventional oil trap air cleaner referred to in general by the reference numeral 116 disposed therein whereby substantially all particles of dirt passing through the inlet end portion of the pipe or conduit 52 toward the intake manifold 24 will be trapped in the filter assembly 116.

In operation, as manifold vacuum within the intake manifold 24 increases, the central portion of the diaphragm 66 will shift toward the left as viewed in FIG. 3 of the drawings thus shifting the rod 68 toward the left so as to exert a pull on the central portion of the lever 72 whereby the lower end of the lever 72 will also swing toward the left. This movement of the free end of the lever 72 will be transmitted to the free end of the actuating lever 102 through the rod 88 and the lowermost Schrader valve 110 will be opened. Then, as the manifold vacuum increases, the middle and uppermost Schrader valves 110 will also be opened whereby additional quantities of ambient air will be admitted into the intake manifold 24 below the carburetor 26. Of course, when the engine 14 is operating under maximum load and full throttle conditions, the manifold vacuum within the intake manifold 24 will be reduced to minimum and the spring 82 will shift the central portion of the diaphragm 66 to the right as viewed in FIG. 3 of the drawings and thus cause the lower end of the actuating lever 102 to swing toward the right to move the lever 102 out of contact with all of the heads 114 of the valve plungers 112.

As hereinbefore suggested, instead of the inlet necks 108 opening at their outer ends to the ambient atmosphere, the inlet necks 108 could be individually or collectively ducted to the interior of the crankcase 20 so as to admit crankcase fumes into the intake manifold 24 in response to an increase of intake manifold vacuum.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with the intake manifold of a naturally aspirated combustion engine, a supplemental air inlet system for said manifold, said system including an inlet line having one outlet end portion thereof opening into the interior of said manifold, flow control valve means operatively associated with the other intake end portion of said line for variably controlling the flow of air thereinto, said slot control valve means including vacuum motor driven actuating means communicated with the interior of said manifold and operative to open and close said valve means in response to increasing and decreasing manifold vacuum, respectively, said intake end portion including a plurality of tubular neck portions spaced therealong and projecting outwardly from one side thereof, a plurality of normally closed valve assemblies secured in said neck portions and including spring-urged outwardly projecting actuators movable inwardly relative to said neck portions against the biasing action of the corresponding springs to open said valve assemblies, said actuating means including an elongated actuator lever extending along said intake end portion and overlying the outer ends of said actuators, means pivotally supporting one end of said lever from said intake end portion for oscillation about an axis disposed generally normal to a plane containing said lever and a portion of said intake end portion from which said neck portions are supported, whereby the other end portion of said lever may be swung toward and away from said intake end portion and the outer ends of said actuators may be engaged by said lever upon swinging movement of the other end of said lever toward said intake end portion, and a vacuum motor operatively communicated with the interior of said manifold and supported from said intake end portion, said vacuum motor including a drive portion reciprocal in a path generally paralleling said plane and extending transversely of said lever, and motion transmitting means operatively connected between said drive portion and the other end of said lever for swinging said other end toward and away from said one side of said intake end portion in response to increasing and decreasing vacuum in said manifold.

2. The combination of claim 1 wherein the maximum effective opening of said valve means is sufficiently small to restrict the admission of supplemental air into said manifold to quantities insufficient to appreciably reduce the vacuum in said manifold.

3. The combination of claim 1 wherein said means pivotally supporting said one end of said lever from said intake end portion includes means operative to adjustably laterally shift the axis of oscillation of said lever toward and away from said one side of said intake end portion.

4. In combination with the intake manifold of a naturally aspirated combustion engine, a supplemental air inlet system for said manifold, said system including an inlet line having one outlet end portion thereof opening into the interior of said manifold, flow control valve means operatively associated with the other intake end portion of said line for variably controlling the flow of air thereinto, said flow control valve means including vacuum motor driven actuating means communicated with the interior of said manifold and operative to open and close said valve means in response to increasing and decreasing manifold vacuum, respectively, said air inlet line including a rigid generally U-shaped portion defining a mounting portion adapted to be stationarily supported from any suitable support surface, said U-shaped portion defining a pair of generally parallel tubular legs interconnected at one pair of corresponding ends by means of a tubular bight portion, said bight portion including a plurality of tubular neck portions spaced therealong and projecting outwardly from the side of said bight portion remote from said legs, a plurality of normally closed valve assemblies secured in said neck portions and including spring urged outwardly projecting actuators movable inwardly relative to said neck portions against the biasing action of the corresponding springs to open said valve assemblies, said actuating means including an elongated actuating lever, mounting means on said U-shaped portion adjacent one end of said bight portion to which one end of said lever is pivotally secured for oscillation about an axis disposed generally normal to the medial plane of said U-shaped portion, said lever extending along said bight portion from said one end thereof and overlying the outer ends of said actuators and being engageable with the latter upon swinging of the other end of said lever in the direction in which said legs extend in order to inwardly displace said actuators for opening said valve assemblies, a cross brace secured between the free ends of said legs, a vacuum motor operatively communicated with the interior of said manifold and supported from said brace and including a drive portion reciprocal toward and away from said bight portion in response to decreasing and increasing vacuum in said manifold, and motion transmitting means operatively connected between said drive portion and the other end of said lever.

5. The combination of claim 4 wherein said motion transmitting means includes a rigid rod whose opposite ends are pivotally supported from said lever and drive portion.

6. The combination of claim 5 wherein said bight portion has a guide sleeve sealingly secured therethrough generally paralleling said legs and through which said rod is slidingly and guidingly received.

7. The combination of claim 4 wherein said mounting means is supported from said U-shaped member for adjustable positioning along a path generally paralleling said legs.

8. The combination of claim 4 including liquid trap air cleaner means disposed in said inlet line.